Dec. 13, 1966 | C. S. McCLELLAN | 3,291,409

MAGNETIC TAPE RECORDER

Filed Aug. 22, 1963

5 Sheets-Sheet 1

CLARENCE S. MC CLELLAN
INVENTOR.

BY Samuel Lindenberg

ATTORNEY

Dec. 13, 1966 C. S. McCLELLAN 3,291,409

MAGNETIC TAPE RECORDER

Filed Aug. 22, 1963 5 Sheets-Sheet 2

CLARENCE S. MC CLELLAN
INVENTOR.

BY Samuel Lindenberg

ATTORNEY

MAGNETIC TAPE RECORDER

Filed Aug. 22, 1963 5 Sheets-Sheet 3

CLARENCE S. MC CLELLAN
INVENTOR.

BY Samuel Lindenberg

ATTORNEY

Dec. 13, 1966 C. S. McCLELLAN 3,291,409

MAGNETIC TAPE RECORDER

Filed Aug. 22, 1963 5 Sheets-Sheet 4

CLARENCE S. MC CLELLAN
INVENTOR.

BY Samuel Lindenberg

ATTORNEY

Dec. 13, 1966 C. S. McCLELLAN 3,291,409

MAGNETIC TAPE RECORDER

Filed Aug. 22, 1963 5 Sheets-Sheet 5

CLARENCE S. MC CLELLAN
INVENTOR.

BY Samuel Lindenberg

ATTORNEY 3,291,409
MAGNETIC TAPE RECORDER
Clarence S. McClellan, Woodland Hills, Calif., assignor to United Electronics Incorporated, Humacao, Puerto Rico, a corporation of Delaware
Filed Aug. 22, 1963, Ser. No. 303,869
6 Claims. (Cl. 242—55.12)

This invention relates to magnetic tape recorders and more particularly to improvements therein.

An object of this invention is to provide a novel, unique and compact tape recorder.

Another object of this invention is the provision of a unique tape transport arrangement for a tape recorder.

Yet another object of this invention is to provide a unique tape cartridge for a tape recorder.

Still another object of the present invention is the provision of a novel arrangement for changing automatically the direction of drive applied to the tape.

Another object of this invention is the provision of a novel and simple self-locking tape cartridge for use with a tape recorder.

The foregoing objects of this invention, as well as others are achieved in a magnetic tape recorder of a type wherein the tape which has been pre-recorded or upon which a recording is desired to be made, is contained within a unique cartridge. The tape is rolled on a supply hub as well as on a take-up hub, which interchange rolls when the direction of the tape motion is reversed. The cartridge is formed so that the rolls of tape on the hubs as well as the hubs are held clamped against motion until such time as the cartridge is inserted into the electronic unit which contains in addition, the tape transport mechanism. This operation enables the tape to move freely from the supply hub to the take-up hub. The transport mechanism which is contained in the electronics unit, comprises drive means which are mounted on a pivoting mechanism such that a roller driven from the drive shaft of said drive means will contact the periphery of the tape roll on the take-up hub and pull tape onto said take-up roll. When the roll of tape on the take-up hub contains substantially all of the tape, this is sensed and the pivotable drive means support pivots to bring the other roller drive in contact with the tape on the supply hub, which is now the take-up hub. This roller drive will then frictionally engage the periphery of the tape on the hub and pull the tape onto the tape roll on that hub. The act of switching the tape drive to reverse direction of the tape motion also acts to switch the magnetic transducer head from one track on the tape to another track.

The cartridge may be easily inserted or withdrawn from the electronic unit. The pivotable member which supports the motor means also actuates an indicator which shows how much tape has been played, and can act also as an index for the selections on the tape.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figures 10, 11:
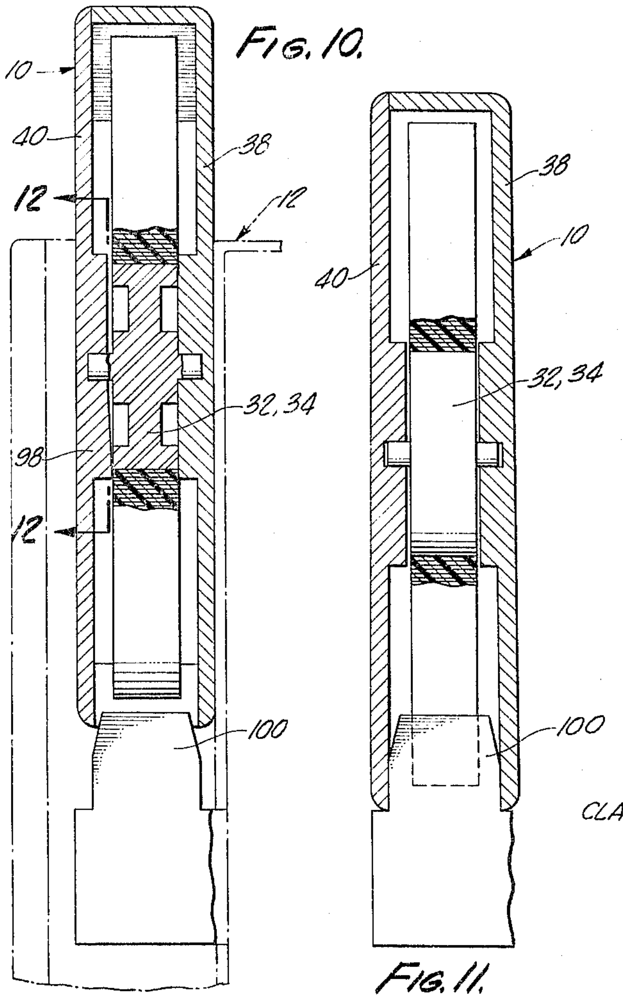
Figure 12:
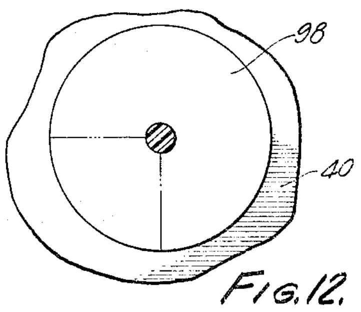
Figure 13:
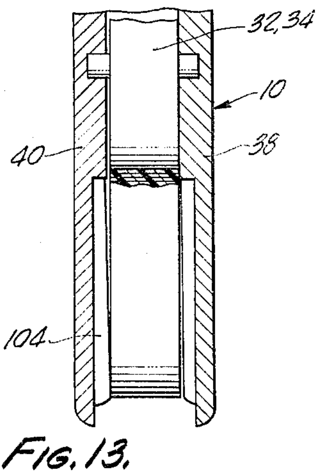
Figure 14:
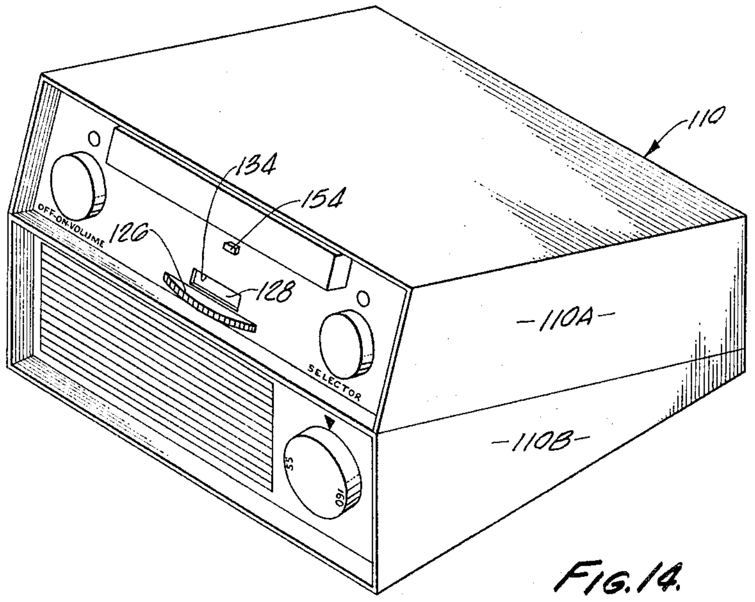
Figure 15:
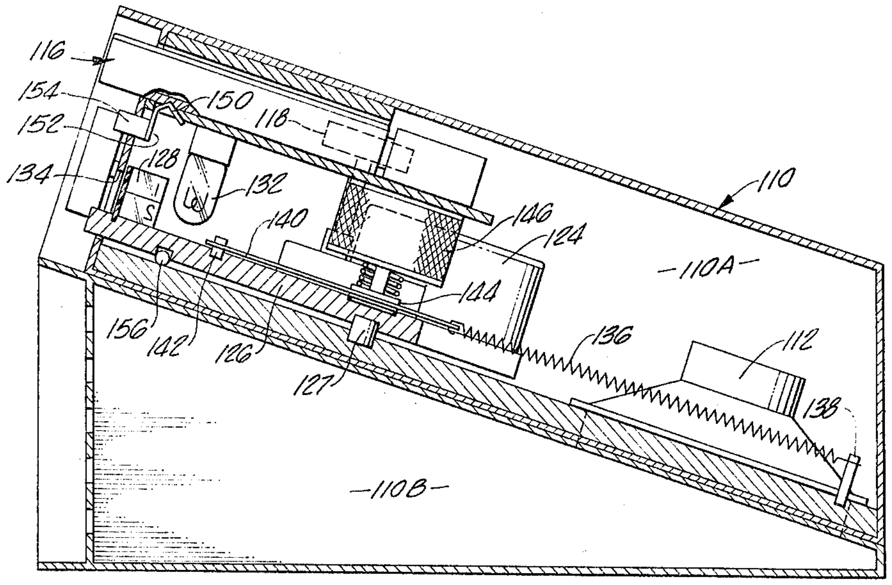
Figure 16:
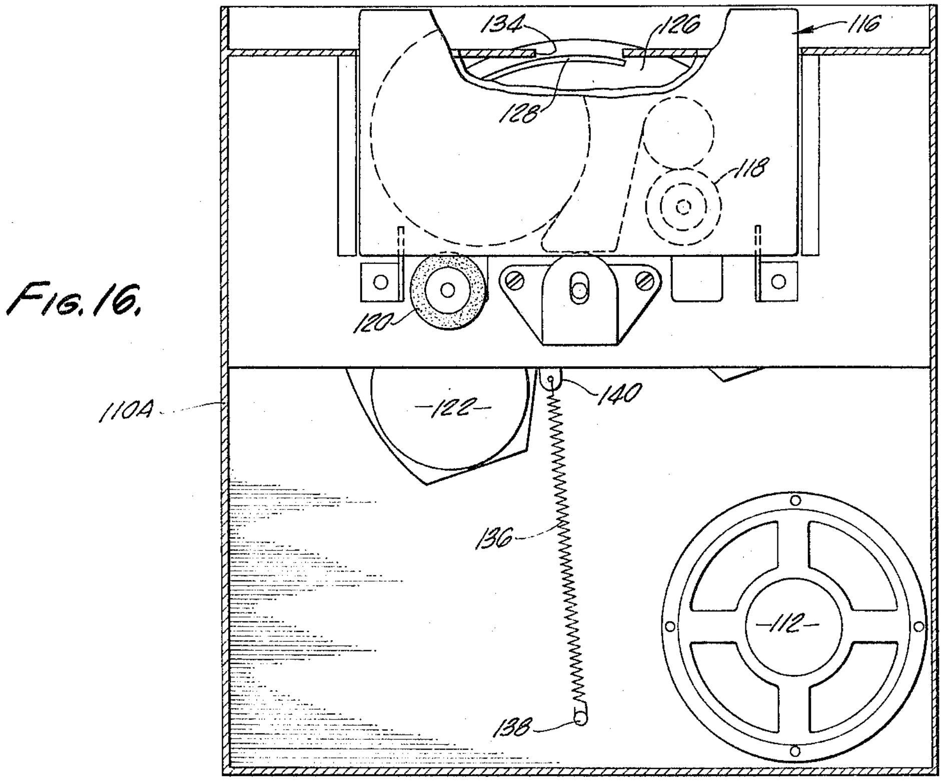
Figure 17:
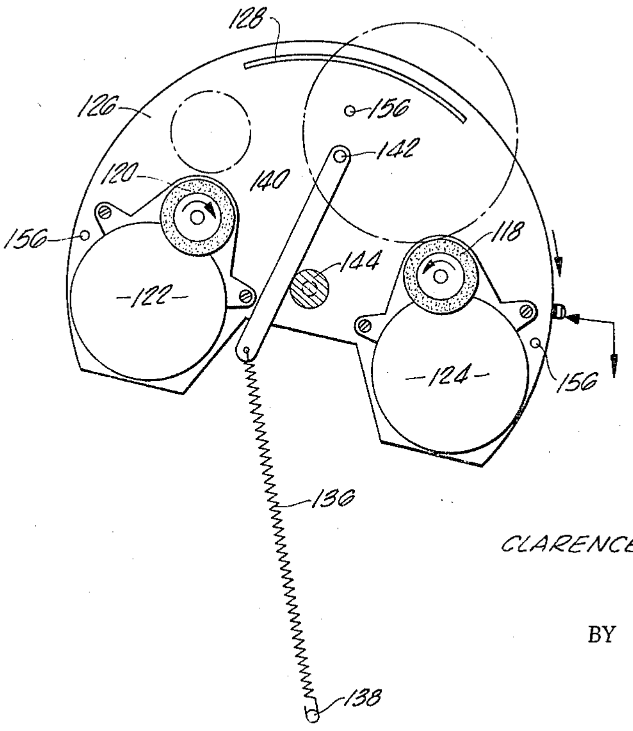

FIGURES 10 and 11 respectively are viewed in sections showing the positions of the tape hub locking mechanism before and after insertion into the tape recorder;

FIGURE 12 is a detail showing the locking hub mechanism in accordance with this invention;

FIGURE 13 is a detail showing a locking rib feature of this invention which additionally or alternatively can be used to hold tape from unrolling when the cartridge is outside of the playback unit;

FIGURE 14 is an isometric view of the external appearance of another embodiment of this invention;

FIGURE 15 is a sectional view illustrating the disposition of the tape transport mechanism and cartridge in accordance with this invention;

FIGURE 16 is a view with the bottom cover removed also showing the disposition of the transport mechanism in accordance with this invention; and FIGURE 17 is a detail of the transport mechanism illustrating the positioning of the two motor drive shafts on the pivotable member relative to the pivot point of said pivotable member for obtaining an improved operation of said tape transport.

Figure 1:
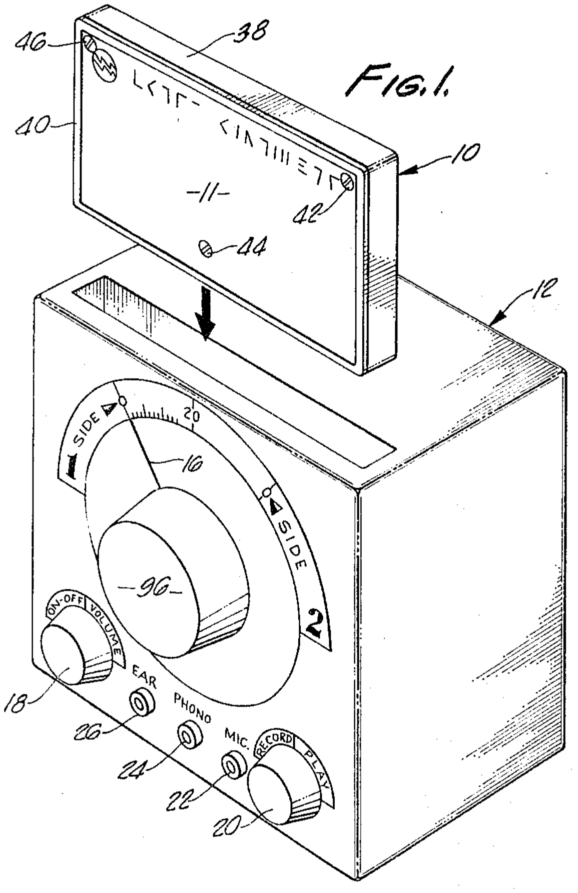
FIGURE 1 is a perspective view of the external appearance of an embodiment of the invention.

Referring now to FIGURE 1, there may be seen an isometric view of a tape recorder in accordance with this invention. This will include a cartridge 10 which contains two rotatably supported hubs on which the supply and take-up tape rolls are wound. The cartridge 10 is inserted into a playback record unit 12. This unit contains the electronic circuitry required for recording and playing back signals from tape. This unit also contains a tape transport mechanism.

On the front face of the play-back record unit housing there is mounted a dial for indicating the amount of tape which has passed by the magnetic tape recorder heads as well as which of the two tracks is presently in use. A movable indicator 16 actuated from mechanism inside the play-back record unit functions in conjunction with the dial to indicate the amount of tape which has been played. Also mounted on the outside of the play-back record unit is an on-off and volume control knob 18. Another control is the record-play back control 20, which serves the function of enabling the user of a tape recorder to either play back pre-recorded tape or to make a recording thereon. The tape recorder is also equipped with the usual input jacks consisting of a microphone input jack 22, and a phono or radio input jack 24. There is also provided an output jack for an earphone 26.

One side 11, of the cartridge 10 may have suitable descriptive literature pasted thereon to indicate the musical content of the tape if the tape is pre-recorded, or the qualities of the tape if the tape is not pre-recorded but is blank.

Figure 2:
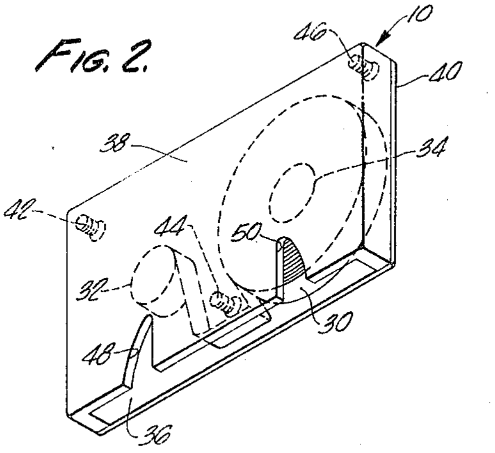
FIGURE 2 is a perspective view illustrating the external appearance of a cartridge in accordance with this invention.

FIGURE 2 shows the appearance of the tape cartridge 10 with the position of the tape 30 and the two rotatable hubs 32, 34, shown therein in dotted lines. The tape cartridge 10 has an open side 36 whereby when the cartridge is inserted into the record play-back unit the tape transport mechanism may engage with the tape for pulling it in a manner to be explained subsequently herein. It should be noted that the tape cartridge case is made of a suitable molded plastic and effectively consists of two parts, respectively 38, 40. The part 38 is the container portion and the part 40 is the cover for the container portion. Those two parts are held together by three screws respectively 42, 44, 46. The V-shaped slots 48, 50 in the bottom of the container permit the drive rollers in the tape transport mechanism to have access to the tape on the hubs.

The operation of the tape transport mechanism in accordance with this invention, is shown illustrated in FIGURES 3 through 9, and in the discussion that follows attention will be directed to these figures. The transport mechanism comprises two substantially identical motors 52, 54, one of which rotates clockwise and the other counterclockwise, which are mounted spaced from one another as by screws 56, 58, on opposite sides of a support member 60, which is pivotably supported therebetween. As may better be seen in FIGURES 6 and 7, the support members 60 actually comprise two pivotably supported plates respectively 60A, 60B, which are attached to the top and bottom of the housing of the motors 52, 54. A base support member comprised of two spaced plates 62A, 62B, etxends from one side of the playback record unit case and a pivot rod 64 extends therethrough to enable the pivotable motor support 60 to pivot thereon. A spring 66 has one end attached to a bolt 68 which extends between the two plates 62A, 62B, of the base support member. The other end of the spring 66 connects to one end of a pull rod 70. The other end of the pull rod 70 connects to another bolt member 72 which is attached to the two plates of the pivotable support for the motors. The spring 66 pulls on the pull rod which in turn serves to tilt the pivotable motor support 60 to one side or the other as determined by the size of the tape roll on the hub.

Figures 3, 4, 5:
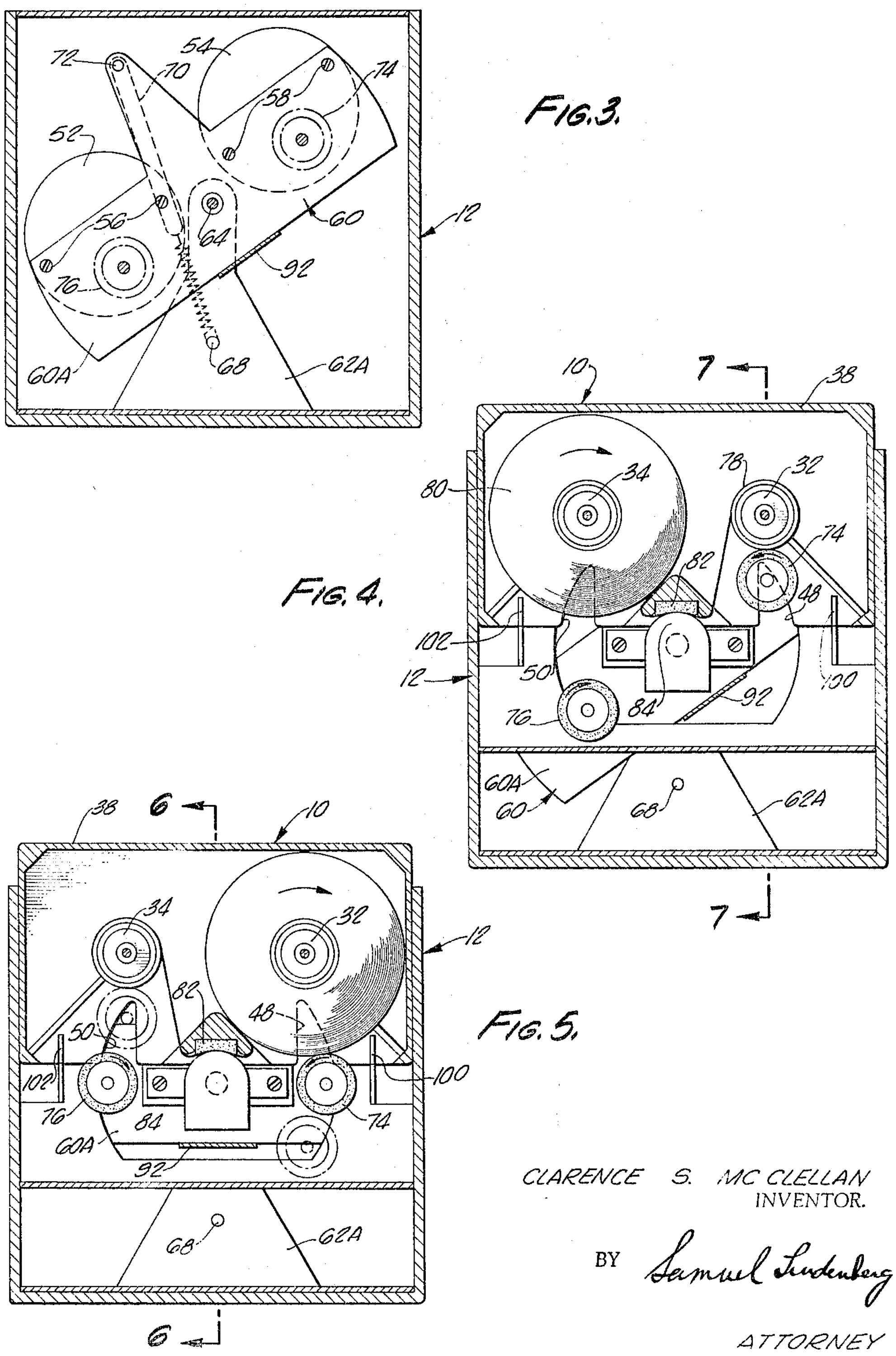
FIGURE 3 is a front view of the transport mechanism in accordance with this invention.
FIGURE 4 illustrates how the transport mechanism in accordance with this invention appears when engaging a practically empty take-up roll in the cartridge.
FIGURE 5 illustrates the appearance of the transport mechanism as viewed along the lines 5—5 of FIGURE 6 in accordance with this invention when the take-up tape roll is substantially full.

As may be seen in FIGURES 3, 4, and 5, each one of the motors drives a tape drive roller, respectively 74, 76. In FIGURE 4 the tape drive roller 74 is in frictional contact with the periphery of the tape which is wrapped around the hub 32. This can be called an empty tape roll 78. The tape roll on the hub 34 can be designated as a full tape roll 80. It will be noted that the tape drive roller 74 rotates in a counterclockwise direction thereby causing the hub 32 to rotate in a clockwise direction which pulls tape from the full tape roll 80. The tape winds off of the full tape roll 80 and over a suitable backing member 82, which is contained within the cartridge. Magnetic tape heads designated generally as 84, are in contact with the magnetic tape in a tape cartridge when the tape is inserted into the play-back record unit. These heads are associated with a different track on the tape. The one of the tracks which is played or recorded on is determined by the position of the tape transport mechanism, as will become clear by the subsequent description herein.

As the tape roll on the hub 32 builds up it pushes the associated tape drive roller outward whereby the pivotable support member 60 pivots about the support 64 against the pressure of the spring 66. This continues until the condition shown in FIGURE 5 is reached.

Figure 7:
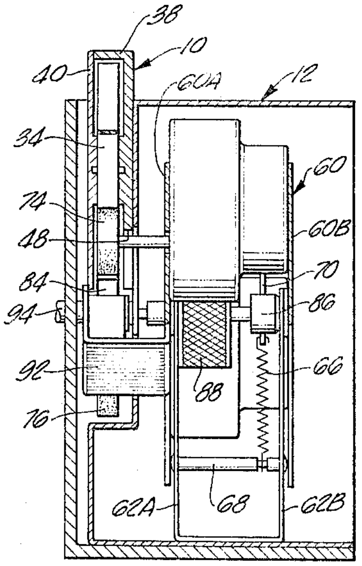
FIGURE 7 is a view in section along the lines 7—7 of FIGURE 4 illustrating the appearance of the solenoid mechanism and the pivotal member supporting the transport motors when engaging a substantially empty roll of tape.
Figure 8:
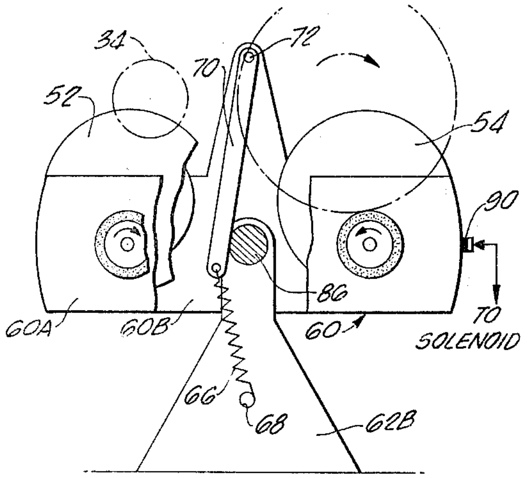
FIGURES 8 and 9 illustrate the operation of the tape transport mechanism just prior to switching from a full tape roll to just after switching to an empty tape roll.

In FIGURE 8 it will be seen that although the tension in the spring 66 on the pull rod 70 would be such as to pivot the pivotable support for the motors to a center position, a solenoid armature 86 prevents this from happening and permits the tape roll which has now been built up to the full size to assume several more turns whereby when the solenoid armature is withdrawn the pivotable support for the motor will have tilted beyond the center position slightly insuring that the spring pull assists it in going all the way. The solenoid 88 which controls the armature 86 may better be seen in FIGURES 6 and 7. A switch contact 90 which is carried by the pivotable motor support 60 when in the position described, closes a circuit to the solenoid 88 enabling it to withdraw the solenoid armature 80. At this time the pivotable motor support can be pivoted by operation of the spring 70 until the tape drive roller 76 comes into frictional engagement with the periphery of the now empty tape roll. Since this tape roller is driven in a clockwise direction, the tape roll rotates in a counterclockwise direction thereby pulling tape back from the other roll.

It should be noted that because of the direct drive from the motor shaft to the periphery of the tape roll, the tape moves at a constant speed past the tape heads despite the fact that the size of the tape roll is constantly changing. It should be further noted that by means which are well-known to those skilled in the art, when the direction of the tape is reversed, a switching between the two heads over the two tracks on the tape is also made to occur. As a result, the tape recorder can continue to play uninterruptedly except for the momentary break occasioned by the switching by the tape drive rollers. As soon as the motor pivotable support has moved to its new position for reversing the direction of the tape motion, the solenoid armature again extends in the path of the push rod, since the solenoid is deactivated.

Figure 6:
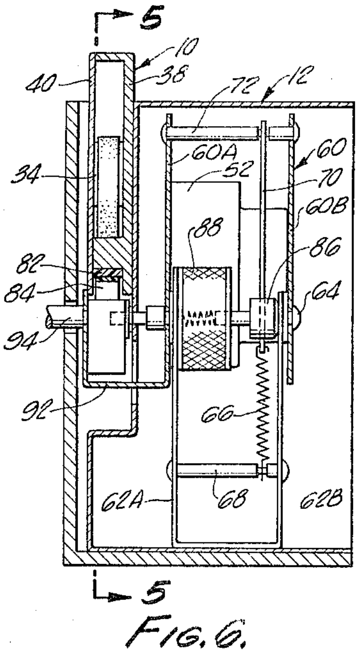
FIGURE 6 is a view in section along the lines 6—6 of FIGURE 5 illustrating the solenoid mechanism which assists in switching the tape transport for obtaining tape direction reverse.

As may be seen in FIGURES 6 and 7, the plate 60A which is a portion of the pivotable support member for the motors has a U-shaped flange portion 92, whereby it can couple to a shaft 94 to which the indicator 16 is attached. It should be appreciated that the angle which is assumed by the pivotable motor support is an indication of the amount of tape which has been played. If it is desired to reverse the direction of motion of the tape, the knob 96 (in FIGURE 1) which is coupled on the shaft 94, may be moved in the direction desired for tape motion. This will cause the pivotable motor support to assume a switching position, as represented in FIGURE 8, whereby it will follow through by snapping into position to reverse the direction of the tape as well as to switch to the proper tape head.

Another feature of this invention is one whereby when a tape cartridge is withdrawn from the play-back record unit the tape rolls are locked securely in place and will not unreel, and yet when the tape cartridge is re-inserted into the play-back record unit the tape rolls can rotate freely. This feature occurs by reason of forming the cartridge case 38, 40, of a resilient plastic material. FIGURES 10 and 11 respectively represent cross sections of the case taken through the region of one of the hubs. FIGURE 10 shows the appearance of the case before it is inserted into the play-back record unit and FIGURE 11 shows the appearance of the case after it is inserted into the play-back record unit. It should be noted that the cover 40 of the cartridge has a ridge 98 formed on the inner surface thereof which bears on both the hub 34 as well as on some of the tape 80. FIGURE 12 is a section along the lines 12—12 of FIGURE 10 and illustrates that this locking ridge section 98, extends over a quarter sector of the hub 34. As a result, when the cartridge is not within the play-back record unit, the tape rolls are tightly clamped and will not come loose.

When the cartridge is inserted into the play-back record unit, two wedges which may be termed "unlocking wedges" are forced into suitably provided openings in the cartridge case, and acting against the resiliency of the material of the cartridge case, spread the case apart sufficiently to move the locking wedges away from the rotatable hub whereby these hubs are enabled to be freely rotatable.

FIGURE 11 illustrates how the unlocking wedges 100, are inserted between the top and container portion of the cartridge to spread it apart thereby freeing the tape and hubs for motion. FIGURES 4 and 5 show the locations of the unlocking wedges respectively 100, 102, which enter the cartridge near its outer ends. The manner of fastening the cover of the cartridge by three screws assists in enabling the cartridge cover to deform sufficiently to free up the hubs and tape when the cartridge is inserted into the play-back record unit, and because of the resiliency of the material when the cartridge is withdrawn, the locking wedge is then again enabled to bear down upon the hubs to hold the tape tightly in position.

FIGURE 13 illustrates another method for preventing the tape from unreeling when the cartridge is not within the play-back record unit and yet rendering it free when the cartridge is inserted within the play-back record unit. This may be used either in addition to or as an alternative to the hub locking feature illustrated in FIGURES 10 and 11. This arrangement may be achieved by forming a rib 104, on the inside of the cover 40 of the cartridge case 10. When the cartridge case is outside of the play-back record unit the rib bears upon the tape roll or rolls within the cartridge, and presses these rolls against a rib 104A formed in the inside wall of case 38. When the cartridge is inserted into the play-back record unit then the same wedges which free up the hubs also spread the top cover of the tape cartridge sufficiently to remove the locking rib from the tape, rendering it freely movable in response to tape drive by the tape transport mechanism described.

FIGURE 14 shows the appearance of another variation of the invention which may be used in automobiles or other locations where it is desired that the tape cartridge be inserted into a play-back record unit which is arranged horizontally rather than vertically as shown in FIGURE 1. The play-back record unit 110 has two sections. The upper section 110A contains all the electronics which is required as well as the tape transport mechanism. The lower section 110B has a roughly trapezoidal shape. As shown in the cross sectional view in FIGURE 15 the lower section 110B merely comprises a sounding box for reflecting sound from the loudspeaker 112 which is located at the rear of the upper section 110A. A cartridge 116 which has the identical construction as the cartridge 10 is inserted into a suitable slot in the play-back record unit 110. The tape therein, as may be seen in FIGURE 16, is engaged by one or the other of two tape drive rollers respectively 118, 120. As shown in FIGURE 17, these tape drive rollers are rotatably driven in opporsite directions of rotation by two motors respectively 122, 124. These drive motors are supported by a pivotable motor support plate 126. The edge of the motor support plate which extends toward the front of the play-back record unit 110 is given a circular configuration and as may be seen in FIGURE 14, extends outside of the case. As may be seen in FIGURE 15, a translucent dial 128 is mounted upon the pivotable motor support plate within a slot 130 provided therefor. This dial is illuminated from behind by a light bulb 132. This dial may be viewed through an opening 134 provided in the play-back record case 110.

The principles of operation of the tape transport mechanism for this embodiment of the invention are the same as was previously described. A spring 136 as may be seen in FIGURES 15 and 17, has one end fixed to a post 138 anchored in the play-back record housing. The other end of the spring it attached to one end of the pull rod 140. The free end of the pull rod is pivotably connected to a pin 142 which is mounted on the center line of the pivotable motor support plate 126.

Figure 9:
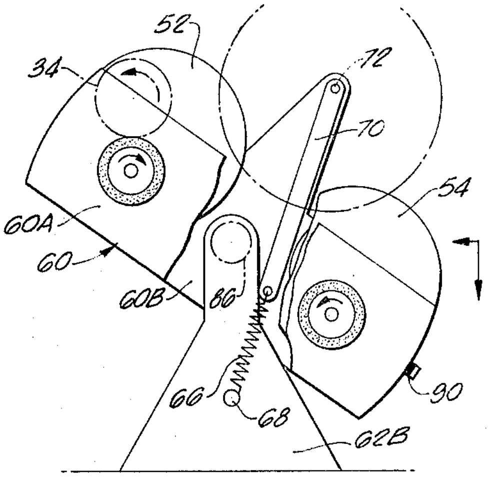

As may be seen in FIGURES 15 and 17, a solenoid armature 144, which is actuated by a solenoid 146, operates in the manner previously described to prevent the pivotable motor support from reaching a neutral position or center position in which the drive rollers would contact neither tape, by the expedient of allowing a sufficient pile-up of tape on one of the rolls till, when the solenoid is released the pivotable support plate for the motors has been pushed beyond a neutral position (relative to the pull of the spring) in the direction it is desired for the support plate to pivot. To further assist in this operation, the drive rollers 118 and 120 instead of being lined up with the pivot point of the pivotable motor support, as is shown in the embodiment of the invention in FIGURES 8 and 9, are moved forward of this point closer toward the tape rolls. This substantially eliminates any chance of the neutral position occurring for the pivotable motor support plate, and also brings the tape tape drive roller which is not engaging a roll of tape, closer to the roll of tape periphery so that the required amount of travel until it makes contact therewith when that tape roll is empty, is shorter than in the previously described embodiment. This shortens up the required reversal time for the tape transport mechanism and also increases the drive friction between the tape roller and the periphery of the tape roll.

Because this embodiment of the invention has been designed to be used in a moving vehicle, an additional feature has been provided whereby the tape cartridge is securely locked in place once it is inserted into the play-back record unit. This may be seen in FIGURE 15. A spring member 150 has one end 152, fixed in the wall of the play-back record member. The bodying the spring member is bent upward so that it will engage a suitably provided slot in the tape cartridge when it is fully inserted into the play-back record unit. Thereby it will prevent the tape cartridge coming out, or becoming loose. The spring member has its other end attached to a button 154, which, as may be seen in FIGURE 14, extends outside of the play-back record unit. When it is desired to remove the tape cartridge this button is depressed to disengage the spring member from the suitably provided notch in the tape cartridge.

It should be noted that the pivotable support for the motor pivots on a pivot pin 127 (see FIGURE 15). There is also provided a bearing race 156 wherein bearings are placed to insure the proper support and free motion of the pivotable motor support 126.

There has accordingly been described and shown herein a novel, useful and unique tape recorder. The tape recorder is of the type which employs a tape cartridge. The tape cartridge includes means for locking the tape in the cartridge against unreeling from the tape rolls while the tape cartridge is outside of a play-back record unit. However, when the tape cartridge is inserted in the play-back record unit the tape rolls may be freely moved. Also provided in the tape recorder is a unique tape transport mechanism whereby the tape is driven directly from motor means by frictional engagement of a drive roller with the periphery of the roll of tape on a hub. Further, the tape transport mechanism automatically reverses the direction of the tape when a roll of tape has been exhausted. The mechanism provided affords a simple, inexpensive, and compact tape recorder.

I claim:

1. In a tape recorder, a tape transport system for winding tape from a first rotatably supported tape roll to a second rotatably supported tape roll until said second tape roll attains a predetermined size at which time said tape transport system winds said tape from said second tape roll to said first tape roll, said tape transport system comprising a first and a second tape drive roller, means for rotatably driving said first and second tape drive rollers in opposite directions, support means for holding said first and second tape drive rollers adjacent the respective first and second tape roll peripheries, means for pivotally supporting said support means between said first and second tape rolls whereby pivoting said support means in one direction brings said first tape drive roller in contact with the tape layer on the periphery of said first tape roll to wind tape thereon from said second tape roll and pivoting said support means in the opposite direction brings said second drive roller in contact with the tape layer on the periphery of said second tape roll to wind tape thereon from said first tape roll, and means responsive to a tape roll reaching a predetermined size for pivoting said support means from a position holding one of said tape drive rollers in contact with the periphery of said filled tape roll to a position holding the other of said tape drive rollers in contact with the periphery of the other tape roll, said last named means comprising spring means having one end attached to said means for pivotably supporting said support means at a point on a center line between said two drive rollers and to one side of said drive rollers, a pull rod having one end connected to the other end of said spring means and the other end pivotably connected to said support means at a point on said center line and on the other side of said two drive rollers, a movable post positioned in the path of motion of said pull rod and substantially on said center line, means for sensing when a tape roll is filled, and means for withdrawing said movable post from the path of motion of said pull rod responsive to said means for sensing when a tape roll is filled.

2. In a tape recorder as recited in claim 1 wherein said movable post positioned in the path of motion of said pull rod comprises the armature of a solenoid, said means for withdrawing said movable post from the path of motion of said pull rod comprises a solenoid in operative relationship with said armature, and said means for sensing when a tape roll is filled comprises an inactive circuit means for energizing said solenoid including an open switch means, and means carried by said support means for closing said switch means to render said circuit means active when said support means has pivoted to a predetermined position established by either said first or said second tape roll attaining said predetermined size.

3. A tape recorder comprising a tape recorder mechanism, and a tape holding cartridge for insertion into said tape recorder mechanism, said tape holding cartridge comprising a box made of resilient material, a pair of hubs, means rotatably supporting said hubs spaced from one another in said box, tape wound on said hubs and extending therebetween, means formed on the inside walls of said box which are operative for preventing the unrolling of tape when said tape holding cartridge is outside of said tape recorder mechanism and are rendered inoperative when said tape holding cartridge is inserted into said tape recorder mechanism, an opening in one side of said container, wedge means in said tape recording mechanism for insertion into said opening for spreading said tape holding cartridge walls to render inoperative said means for preventing the unrolling of tape, and tape transport means in said tape recorder mechanism for frictionally engaging the periphery of said tape wound on one of said hubs for rolling tape thereon from the other of said hubs, said tape transport means including a first and a second tape drive roller, means for rotatably driving said first and second tape drive roller in opposite directions, means for bringing one of said tape drive rollers in frictional engagement with the tape on the periphery of one of the tape rolls on one of the hubs to drive tape thereon until a predetermined sized roll is reached, and means responsive to said roll reaching said predetermined size to move said one tape drive roller away from said predetermined size roll and to move said other tape drive roller in frictional engagement with the tape on the periphery of the tape roll on the other of said hubs to drive tape thereon.

4. A tape recorder comprising a tape recorder mechanism and a tape holding cartridge for insertion into said tape recorder mechanism, said tape holding cartridge comprising a box made of resilient material, a first and second hub, means rotatably supporting said first and second hubs spaced from one another in said box, tape wound on said first and second hubs and extending therebetween, said tape wound on said respective first and second hubs respectively comprising first and second tape rolls, means formed on the inside walls of said box for engaging said first and second hubs and tape rolls for preventing the unrolling of tape when said tape holding cartridge is outside of said tape recorder mechanism and which are rendered inoperative when said tape holding cartridge is inserted into said tape recorder mechanism, an opening in one side of said container, wedge means in said tape recording mechanism for insertion into said opening for spreading said tape holding cartridge walls to render inoperative said means for preventing the unrolling of tape, a tape transport apparatus in said tape transport mechanism for winding tape from said first tape roll to said second tape roll until said second tape roll attains a predetermined size at which time said tape transport system winds said tape from said second tape roll to said first tape roll, said tape transport system comprising a first and second tape drive roller, means for rotatably driving said first and second tape drive rollers in opposite directions, support means for holding said first and second tape drive rollers adjacent the respective first and second tape roll peripheries, means for pivotably supporting said support means between said first and second tape rolls whereby pivoting said support means in one direction brings said first tape drive roller in contact with the tape layer on the periphery of said first tape roll to wind tape thereon from said second tape roll and pivoting said support means in the opposite direction brings said second tape drive roller in contact with the tape layer on the periphery of said second tape roll to wind tape thereon from said first tape roll, and means responsive to a tape roll reaching said predetermined size for pivoting said support means from a position holding one of said tape drive rollers in contact with the periphery of said filled tape roll to a position holding the other of said tape drive rollers in contact with the periphery of other tape roller.

5. In a tape recorder as recited in claim 4 wherein said means responsive to a tape roll reaching a predetermined size for pivoting said support means from a position holding one of said tape drive rollers in contact with the periphery of said filled tape roll to a position holding the other of said tape drive rollers in contact with the periphery of the other tape roll comprises spring means having one end attached to said means for pivotably supporting said support means at a point on a center line between said two drive rollers and to one side of said drive rollers, a pull rod having one end connected to the other end of said spring means and the other end pivotably connected to said support means at a point on said center line and on the other side of said two drive rollers, a movable post positioned in the path of motion of said pull rod and substantially on said center line, means for sensing when a tape roll is filled, and means for withdrawing said movable post from the path of motion of said pull rod responsive to said means for sensing when a tape roll is filled.

6. In a tape recorder as recited in claim 5 wherein said movable post positioned in the path of motion of said pull rod comprises the armature of a solenoid, said means for withdrawing said movable post from the path of motion of said pull rod comprises a solenoid in operative relationship with said armature, and said means for sensing when a tape roll is filled comprises an inactive circuit means for energizing said solenoid including an open switch means, and means carried by said support means for closing said switch means to render said circuit means active when said support means has pivoted to a predetermined position established by either said first or said second tape roll attaining said predetermined size.

References Cited by the Examiner

UNITED STATES PATENTS

| | | | |
|---|---|---|---|
| 2,457,699 | 12/1948 | Marsen | 242—54.1 X |
| 2,919,866 | 1/1960 | Minott. | |
| 2,922,642 | 1/1960 | Cousino | 242—55.19 X |
| 2,943,805 | 7/1960 | Loewe | 242—55.13 |
| 3,145,941 | 8/1964 | Proctor | 242—55.12 |

FRANK J. COHEN, *Primary Examiner.*

GEORGE F MAUTZ, *Examiner.*